June 6, 1944. J. TORMA 2,350,428
MACHINE FOR PRODUCING OVAL OBJECTS AND FRAMES
Filed April 22, 1943 4 Sheets-Sheet 2
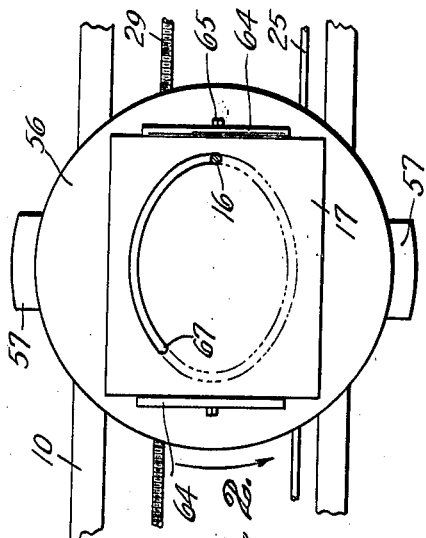
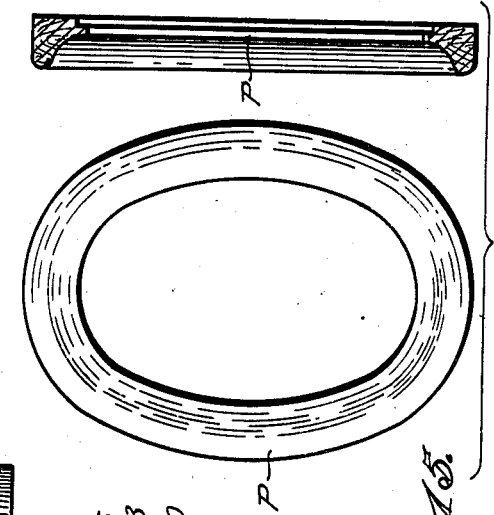
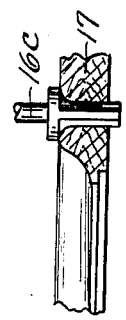
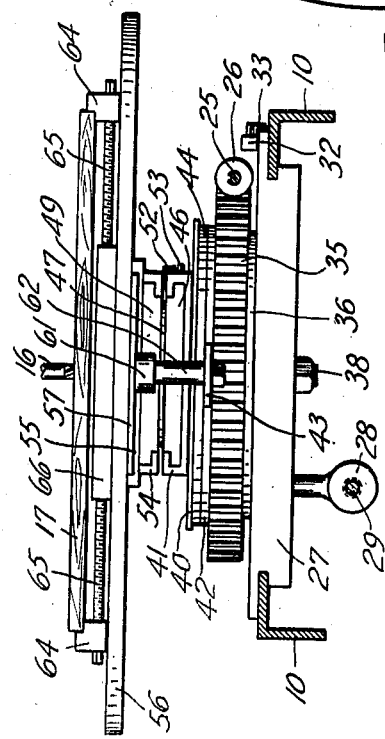
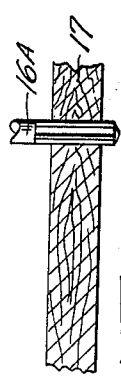
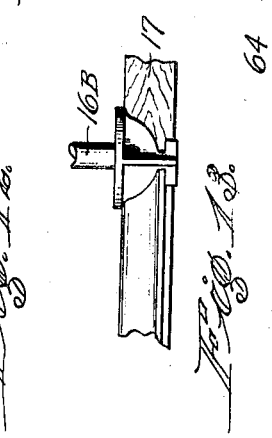
Inventor
JOSEPH TORMA
By
Attorney

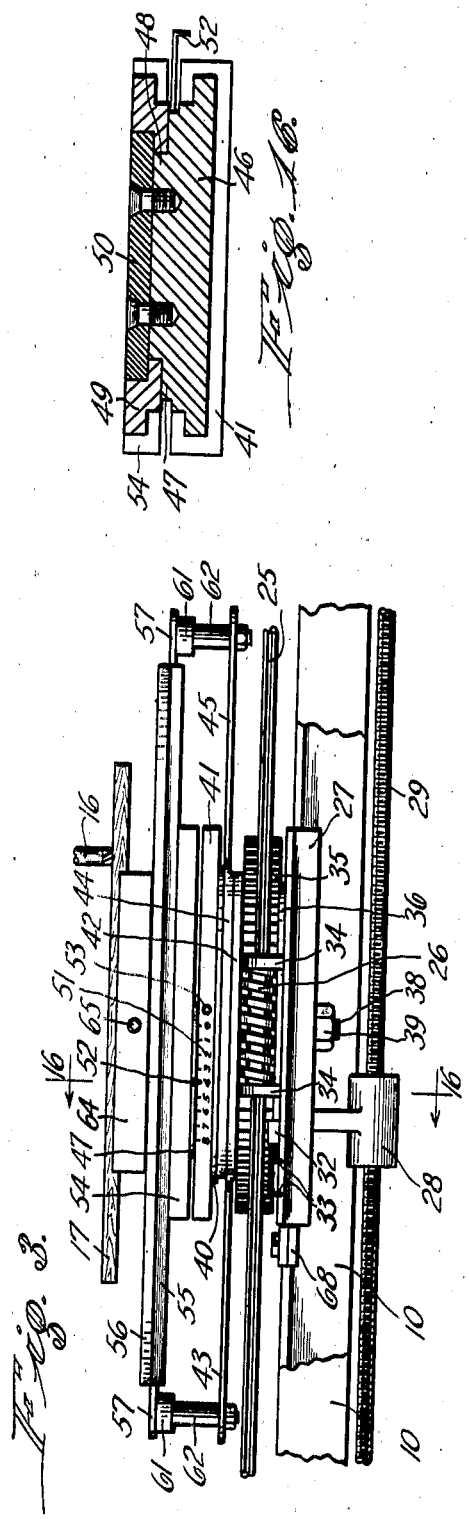

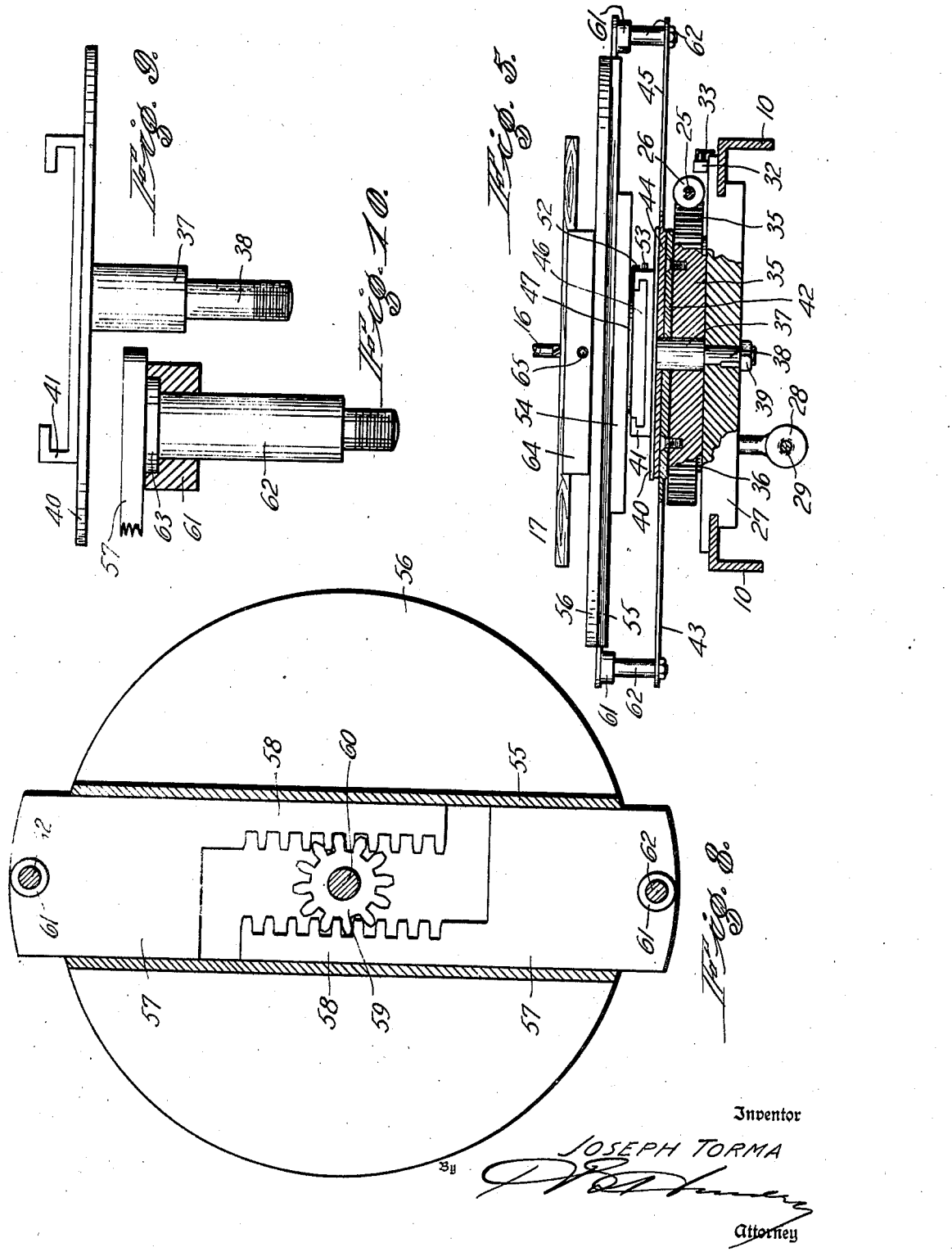

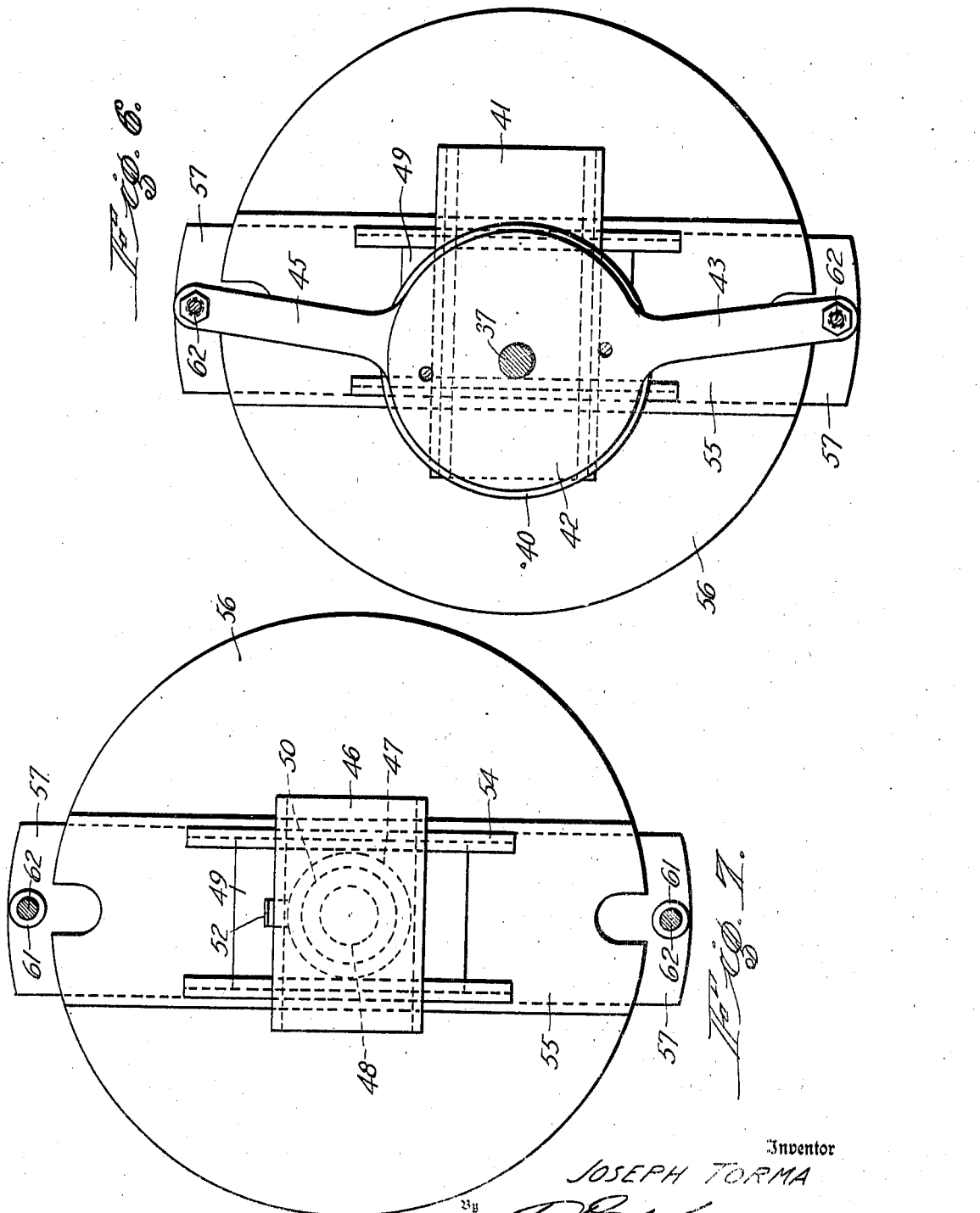

Patented June 6, 1944

2,350,428

UNITED STATES PATENT OFFICE 2,350,428

MACHINE FOR PRODUCING OVAL OBJECTS AND FRAMES

Joseph Torma, Hamilton, Ontario, Canada

Application April 22, 1943, Serial No. 484,101

8 Claims. (Cl. 144—134)

This invention relates to improvements in machines for producing flat oval or elliptical objects either solids or frames such as picture frames and like products, and consists essentially of a stationary (non-travelling) cutting and/or shaping unit and a movable unit for guiding the work in an oval circuit.

The principal object of the invention is to provide a machine for producing true oval objects and frames such as picture frames and the like in one piece.

Another important object is to provide such a machine in which provision is made for moving the work in an ovate or elliptical circuit while a stationary (non-travelling) cutter and/or shaper is at work.

Another important object is to provide a gauge by which the machine can be set for the predetermined marginal dimension of the oval article to be produced, and by which the machine may be also set for the thickness or inside dimension of a frame.

Another important object is to provide a gauge for accurately varying the proportions of an oval product.

A further object is to provide a machine of the class specified which will be comparatively simple, durable and efficient in its operation, comparatively easy to construct, and simple to operate.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation of a machine constructed in accordance with this invention.

Figure 2 is a top view of that portion of the machine shown bracketed in Figure 1.

Figure 3 is an enlarged detailed elevation of that portion of the machine shown bracketed in Figure 1.

Figure 4 is an enlarged cross-sectional end elevation taken on the line 4—4 of Figure 1 showing certain arms as they are seen in their position in Figures 1 and 3.

Figure 5 is a view similar to Figure 4 but showing in partial section certain of the members which appear in complete elevation in Figure 4, and showing the arms as they appear when certain of the members have been moved ninety degrees.

Figure 6 is a bottom view of the table assembly including the arms.

Figure 7 is a bottom view of the table assembly with the arms removed.

Figure 8 is a bottom view of the table showing certain opposed reciprocal members and racks.

Figure 9 is a greatly enlarged elevation of a certain centre pin, disc and slideway assembly.

Figure 10 is a greatly enlarged elevation of one of the wrist pin assemblies.

Figure 11 is a fragmentary perspective view of the gauging means for setting the machine for the particular dimensions of an oval object or frame to be produced.

Figure 12 is a fragmentary view of a cutting bit in process of cutting an oval piece from stock.

Figure 13 is a fragmentary view of a shaping bit in process of shaping the internal profile of a picture frame or the like.

Figure 14 is a fragmentary view of a combined cutting and shaping bit in process of forming the rim or outer profile of a picture frame or the like object.

Figure 15 is an elevation and sectional view showing a picture frame as an example of one of many possible products of the machine.

Figure 16 is a greatly enlarged end view of certain slides and slideways as they are seen in Figure 3, but with the slides and certain parts of the slides shown in detail in cross-section on a line 16—16 in that figure.

In its present embodiment the invention consists of a track comprising a pair of parallel rails 10 suitably in the form of angle bars mounted on suitable supports 11. Practicably supported on one end of the track is a pillar 12 supporting an arm 13 overreaching the track and at the end of which is a vertical guide 14. In this guide, in common with drill presses is a rotating device carrying a chuck 15, and which may be raised and lowered, as necessary, to engage or to disengage a drill or shaper 16 with the work here indicated as a board or slab 17. The drill bit or shaping bit 16, as the case may be, is revolved by means of a belt 18 connected to a suitable source of power here indicated by the electric motor 19 conveniently mounted on the pillar 12. On the lower end of the vertical motor shaft 20 is a belt transmission 21 to a vertical shaft 22, similarly mounted on the pillar 12. The shaft 22 carries a worm 23 meshed with a worm gear 24, the latter being fast on a shaft 26 which is conveniently mounted parallel with the rails 10 and close to one of them. Slidingly keyed on the shaft 25 is a worm 26.

Slidably grooved to the rails 10 is a bed 27, and dropped from the bed is an internally threaded sleeve or traveller nut 28 through which a leader screw 29 passes and is also suitably journalled at the foot of the machine and provided with a hand-wheel 30. Thus by rotating the screw 29 the bed 27 may be shifted along the rails in either direction according to that in which the screw is revolved. The position of the bed lengthwise of the rails or bars 10 determines the size (not the proportion) of the oval piece to be cut from the stock 17, or in the case of a frame to be cut from the stock, the overall dimensions of the frame and the thickness of the frame, as will now be explained.

Conveniently on the visible side of one of the rails or bars 10 is a graduated scale 31 in standard units of linear measurement such as inches and equal fractions thereof. On the bed 27 is a block 32 or other suitable device from which extends a pair of fingers 33. If, for instance, the picture frame to be produced from the slab or stock 17 is to have an outside measurement of eleven inches and an inside measurement of ten inches, the finger or pointer denoting the inside measurement is brought into registry with the tenth inch, as will be seen in Figure 11, by revolving the screw 29 in the proper direction. After cutting away the material inside the frame, as will be later described, the finger denoting the outside measurement is brought into registry with the eleventh inch by moving the bed 27 in the proper direction similarly by the screw 29. Thus it will be understood that the farther the bed 27 is moved toward the foot of the machine, the closer the cutter or shaper 16 will lie to the periphery of the work 17, and similarly the nearer the bed 27 is moved toward the head of the machine, the smaller will be the oval cut in the work.

As has been previously specified, there is a worm 26 slidably keyed on the shaft 25, the latter having bearings flanking the worm in the form of lugs or ears 34. Thus the worm 26 is free to follow the bed 27 as the latter is moved from time to time as becomes necessary. The worm 26 is constantly meshed with a worm gear 35 which it revolves, as can be seen, jointly with the rotation of the cutter or shaper 16, but at a substantially reduced relative speed. The worm gear 35, which has a boss 36 resting on the bed 27 and which with the gear 35 revolves thereon, is free on a fixed pin 37 which has a reduced portion 38 keyed into the bed 27 and solidly secured thereto by the nut 39. By referring now particularly to Figure 9 it will be seen that solidly mounted on the fixed pin 37 is a stationary disc 40 whereon in turn is solidly mounted a stationary slideway 41. Fixed to the upper face of the worm gear 35 is a hub 42 free on the pin 37 from which extends a horizontal power arm 43 which swings with the rotation of the worm gear, and above the hub 42 is a free hub 44 also on the pin 37 from which extends an opposed follower arm 45. Slidingly mounted in the slideway 41 is a slide 46 having a reduced and rounded spacer portion 47 and a still further reduced pivotal portion 48 on which a cross-slide 49 revolves.

The cross-slide 49 also revolvingly bears on the shoulder between the pivotal portion 48 and the reduced portion 47 of the slide 46. Mounted or fixed to the top of the portion 48 is a round capping plate 50 annularly grooved into the slide 49, and about which the slide 49 also pivotally revolves. From the foregoing description it will be observed that the slide 49 travels lengthwise of the machine with the slide 46, but is revolvable thereon.

Conveniently on the outside face of the slideway 41 is a scale 51 divided into standard units of linear measurement such as inches, and a finger 52 attached to and extending from the reduced shoulder portion 47 of the slide 46 may be brought into registry with any of the divisions of said scale or fractions thereof by first loosening a set screw 53 which extends through one wall of the slideway 41 and bears against the slide 46, then moving the slide 46 to the required position in the slideway 41. This scale provides for setting the machine for the predetermined proportions of the oval object to be cut or shaped, for instance, in Figure 3 it will be seen that the finger or pointer 52 falls in registry with the fourth inch on the scale 51 and the result will be, according to that setting, an oval product four inches longer than its width. After setting the finger 52 for the required proportions, the set screw 53 is retightened against the slide, and during the operation of the machine the slide 46 and the slideway 41 function as one piece. Zero, it will be noted, falls on the axis of the centre pin 37, and if the device was set exactly at zero at the beginning of the scale the product of the machine would be in true circular form.

Mounted upon the slide or guide 49 is a slideway or guided member 54 which during the operation of the machine slides back and forth, as will later appear. Solidly mounted on the slideway 54 is a sleeve or way 55 which is rectangular in cross-section and upon which in turn is solidly mounted a circular work table 56. Slidingly engaged in the sleeve 55 are a pair of opposed reciprocal members 57 provided with opposed racks 58, and a pinion 59 revolvable on a stub shaft 60 which is suitably dropped from the centre of the table 56, lies between and meshes with the racks. On the outer protruding ends of the reciprocal members 57 are hubs or bearings 61 for wrist pins 62 which are solidly bolted or otherwise suitably secured to the arms 43 and 45, and which are preferably provided with heads 63 recessed into the bearings 61.

Mounted on the table 56 is a work vise conveniently consisting of the jaws 64, which are here shown clamping the board or slab of work material 17, conventional screws 65 and buckle or coupling 66.

It will be noted, as apparent in Figure 4, the arms 43 and 45, although only the near arm 43 is visible, are in alignment, while in Figure 6 the arms are seen to fall at an obtuse angle to each other, and the table 56 is off-centre of the pin 37. The distance, therefore, between the centre of the table 56 and the centre of the pin 37 equals the difference between the length and the breadth of the oval object to be cut as determined by the setting of the pointer or finger 52 on the scale 51. That is to say, when the machine is in operation, the degree of deviation of the arms 43 and 45 from co-alignment, which occurs twice in each revolution of the table 56, determines the proportion of the oval in which the object is to be cut or shaped. The wider the object is to be in comparison to its length, the more the arms in operation will deviate from co-alignment and the greater will be the distance between the maximum deviation in operation, as will be apparent by the comparative position of the pin 37, and the centre of the table, as seen in Figure 6.

The arm 43 which is the power arm, as is apparent by its rigid connection to the worm gear 35, revolves the table by means of the pin connecting it with the corresponding reciprocating member 57. During the deviation of the arms from co-alignment the distance between the centres of the pins 62 of course is decreased, and increased during the return of the arms to co-alignment. This motion causes the reciprocal members 57 to move toward and away from each other, respectively, the member attached to the power arm 43 properly imparting like motion to the opposing member 57 through the medium of the pinion 59. The deviation of the arms causes the slideway 54 to track back and forth on the slide or guide 46 similarly twice in incidence during each revolution of the table.

The purpose of the following arm 45 is to properly balance or proportion the oval object to be cut, otherwise, according to experiments, it has been found that the product would be unbalanced or egg shaped, the curvature at one end of the oval more acute than the other. Thus when the arms 43 and 45 are in their deviated or deflected position, and when the centres of the pins 62 are closest together, the arms are crosswise of the machine, as they appear in Figure 5 and would appear, if they were visible in Figure 2, and it follows that the arms are co-aligned and the pins 62 are at their widest separated point when the arms are lengthwise of the machine as will be observed in Figures 1, 3 and 4. Referring here to Figure 6, the pin 37 is notably always in the true centre of the bed 27, and it will therefore be seen that the table 56 is caused to move ovately about the axis of the pin 37.

The cutting or shaping may be commenced at any point on the oval path it is destined to take. In this respect we might now refer to Figure 2 where it will be seen that the cutting tool or drill 16 has first penetrated the material at point 67, and has progressed approximately one-third of the circuit it is to take before completing the cutting out operation, and it will be seen that the reciprocal members 57 lie crosswise or transversely of the machine and the arms 43 and 45 will be in the deflected position as they are observed in Figure 6.

Indicated at 68 in Figure 3 is a stop which may be moved and fastened at the required point on one of the rails 10 and against which the bed 27 abuts during such instances as when the machine is at work in uniform production.

As will be readily understood, the machine is set in motion by turning on the electric motor 19, whereupon the table 56 is caused to commence its ovate circuit simultaneously with the commencement of motion of the cutter or shaper 16.

Since all varieties of types of drills, cutters and shapers may be used depending on the class of work which may be produced by the machine, only some of them have been here shown. Considering the production of a picture frame merely as an example, the first step in the operation is shown in Figure 12 in which a drill 16A can be seen which has penetrated the work or material and is now in progress cutting out the afterwards discarded centre part from the material from which the frame is to be formed. Figure 13 shows not necessarily a second step but a further step, and a shaper or shaping tool 16B is here seen forming the inner ornamental or symmetrical contour of the frame simultaneously with the glass and picture groove. In Figure 14 is seen another form of shaper 16C carrying the rounded portion of the inside profile to the outside of the frame and separating the finished frame from the material. In the practice of economy, small frames may be first formed, next larger, and so on until the material has been exhausted. An example of the completed product in the form of a picture frame P is shown in full and in sectional profile in Figure 15.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

I claim:

1. In an apparatus for directing a work table in an ovate circuit in travelling registry with a stationary tool, a supporting bed, a stationary upstanding centre pin associated with the bed, a rotary driven member centred on said pin, a horizontally extending power arm solidly associated with said rotary member and adapted to regularly rotate therewith about the axis of said pin, a similar following arm extending substantially opposite the first arm and free on said pin, a revolvable slide, a slideway reciprocally movable along said slide, a sleeve solidly mounted on the slideway, a work table solidly mounted on said sleeve for controlled rotary and reciprocal movement together with the slideway, opposed reciprocal members opposingly movable within the sleeve, means for imparting oppositely directed movement to one reciprocal member by the other, one said reciprocal member being pinned to the power arm and the other member to the following arm, said arms alternately falling in co-aligned position and in unaligned position twice during each table revolution, said table reciprocating as one with the slideway twice during its revolution on a range equal to the distance between a line drawn between the axes of the arm pinnings when the arms lie at their maximum deviation from co-alignment and a line drawn parallel to the first line through the axis of the vertical centre pin, whereby an oval is described by the stationary tool on work properly supported by the table during a cyclic operation consisting of a single revolution produced simultaneously with two complete back-and-then-forward movements of the table.

2. In an apparatus for directing a work table in an ovate circuit in travelling registry with a stationary tool, a supporting bed, a stationary upstanding centre pin associated with the bed, a rotary driven member centred on said pin, a horizontally extending power arm solidly associated with said rotary member and adapted to regularly rotate therewith about the axis of said pin, a similar following arm extending substantially opposite the first arm and free on said pin, a horizontal fixed slideway above said pin, a slide reciprocable for variable point setting in said slideway and having a vertically extending pivot, a second slide revolvable on said pivot, a second slideway reciprocally movable along said slide, a sleeve solidly mounted on the second slideway, a work table solidly mounted on said sleeve for controlled rotary and reciprocal movement together with the second slideway, opposed reciprocal members opposingly movable within the sleeve, means for imparting oppositely directed movement to one reciprocal member by the other, one said reciprocal member being pinned to the power arm and the other member to the following arm, said arms alternately falling in co-aligned position and in unaligned position twice during each table revolution, said table reciprocating as one with the second slideway twice during its revolution on a range equal to the distance between a line drawn between the axes of the arm pinnings when the arms lie at their maximum deviation from co-alignment and a line drawn parallel to the first line through the axis of the vertical centre pin, whereby an oval is described by the stationary tool on work properly supported by the table during a cyclic operation consisting of a single revolution produced simultaneously with two complete back-and-then-forth movements of the table.

3. In an apparatus for directing a work table in an ovate circuit in travelling registry with a stationary tool, a supporting bed, a stationary upstanding centre pin associated with the bed, a rotary driven member centred on said pin, a horizontally extending power arm solidly associated with said rotary member and adapted to regularly rotate therewith about the axis of said pin, a similar following arm extending substantially opposite the first arm and free on said pin, a horizontal fixed slideway above said pin, a slide reciprocable for variable point setting in said slideway and having a vertically extending pivot, a scale consisting of units of linear measurement on said slideway, a finger solidly associated with said slide for selective registry with the scale units, means of releasing said slide for scale setting movement in said slideway and of subsequently reimmobilizing it therein, a second slide revolvable on said pivot, a second slideway reciprocally movable along said slide, a sleeve solidly mounted on the second slideway, a work table solidly mounted on said sleeve for controlled rotary and reciprocal movement together with the second slideway, opposed reciprocal members opposingly movable within the sleeve, means for imparting oppositely directed movement to one reciprocal member by the other, one said reciprocal member being pinned to the power arm and the other member to the following arm, said arms alternately falling in co-aligned position and in unaligned position twice during each table revolution, said table reciprocating as one with the second slideway twice during its revolution on a range equal to the distance between a line drawn between the axes of the arm pinnings when the arms lie at their maximum deviation from co-alignment and a line drawn parallel to the first line through the axis of the vertical centre pin, whereby an oval is described by the stationary tool on work properly supported by the table during a cyclic operation consisting of a single revolution produced simultaneously with two complete back-and-then-forth movements of the table.

4. In an apparatus for directing a work table in an ovate circuit in travelling registry with a stationary tool, a track mounted on and included as part of an apparatus frame, a scale consisting of units of linear measurement on a visible portion of the track, a supporting bed reciprocally movable on the track for selectively varying the relative lateral distance between the tool and work table centre, a finger solidly associated with the bed for selective registry with the scale units, combined means of leading and of immobilizing said bed, a stationary upstanding centre pin associated with the bed, a rotary driven member centred on said pin, a horizontally extending power arm solidly associated with said rotary member and adapted to regularly rotate therewith about the axis of said pin, a similar following arm extending substantially opposite the first arm and free on said pin, a horizontal fixed slideway above said pin, a slide reciprocable for variable point setting in said slideway and having a vertically extending pivot, a second slide revolvable on said pivot, a second slideway reciprocally movable along said slide, a sleeve solidly mounted on the second slideway, a work table solidly mounted on said sleeve for controlled rotary and reciprocal movement together with the second slideway, opposed reciprocal members opposingly movable within the sleeve, means for imparting oppositely directed movement to one reciprocal member by the other, one said reciprocal member being pinned to the power arm and the other member to the following arm, said arms alternately falling in co-aligned position and in unaligned position twice during each table revolution, said table reciprocating as one with the second slideway twice during its revolution on a range equal to the distance between a line drawn between the axes of the arm pinnings when the arms lie at their maximum deviation from co-alignment and a line drawn parallel to the first line through the axis of the vertical centre pin, whereby an oval is described by the stationary tool on work properly supported by the table during a cyclic operation consisting of a single revolution produced simultaneously with two complete back-and-then-forth movements of the table.

5. In an apparatus for directing a work table in an ovate circuit in travelling registry with a stationary tool, a supporting bed, a stationary upstanding centre pin associated with the bed, a rotary driven member centred on said pin, a horizontally extending power arm solidly associated with said rotary member and adapted to regularly rotate therewith about the axis of said pin, a similar following arm extending substantially opposite the first arm and free on said pin, a disc solidly mounted on said pin, a horizontal fixed slideway solidly mounted on said disc, a slide reciprocable for variable point setting in said slideway and having a vertically extending pivot, a second slide revolvable on said pivot, a second slideway reciprocably movable along said slide, a sleeve solidly mounted on the second slideway, a work table solidly mounted on said sleeve for controlled rotary and reciprocal movement together with the second slideway, opposed reciprocal members opposingly movable within the sleeve, means for imparting oppositely directed movement to one reciprocal member by the other, one said reciprocal member being pinned to the power arm and the other member to the following arm, said arms alternately falling in co-aligned position and in unaligned position twice during each table revolution, said table reciprocating as one with the second slideway twice during its revolution on a range equal to the distance between a line drawn between the axes of the arm pinnings when the arms lie at their maximum deviation from co-alignment and a line drawn parallel to the first line through the axis of the vertical centre pin, whereby an oval is described by the stationary tool on work properly supported by the table during a cyclic operation consisting of a single revolution produced simultaneously with two complete back-and-then-forth movements of the table.

6. In an apparatus for directing a work table in an ovate circuit in travelling registry with a stationary tool, a supporting bed, a stationary upstanding centre pin associated with the bed, a rotary driven member centred on said pin, a horizontally extending power arm solidly associated with said rotary member and adapted to regularly rotate therewith about the axis of said pin, a similar following arm extending substantially opposite the first arm and free on said pin, a horizontal fixed slideway above said pin, a slide reciprocable for variable point setting in said slideway and having a vertically extending pivot, a second slide revolvable on said pivot, a second slideway reciprocally movable along said slide, a sleeve solidly mounted on the second slideway, a work table solidly mounted on said sleeve for controlled rotary and reciprocal movement together with the second slideway, opposed reciprocal members opposingly movable within the sleeve, means for imparting oppositely directed movement to one reciprocal member by the other, one said reciprocal member being pinned to the power arm and the other member to the following arm, said arms alternately falling in co-aligned position and in unaligned position twice during each table revolution, said table reciprocating as one with the second slideway twice during its revolution on a range equal to the distance between a line drawn between the axes of the arm pinnings when the arms lie at their maximum deviation from co-alignment and a line drawn parallel to the first line through the axis of the vertical centre pin, whereby an oval is described by the stationary tool on work properly supported by the table during a cyclic operation consisting of a single revolution produced simultaneously with two complete back-and-then-forth movements of the table, and means for energizing said driven member and said stationary tool simultaneously.

7. An apparatus according to claim 6 wherein the rotary driven member consists of a worm driven worm gear.

8. In an apparatus for directing a work table in an ovate circuit in travelling registry with a stationary tool, a track mounted on and included as part of an apparatus frame, a scale consisting of units of linear measurement on a visible portion of the track, a supporting bed reciprocally movable on the track for selectively varying the relative lateral distance between the tool and work table centre, a finger solidly associated with the bed for selective registry with the scale units, combined means of leading and of immobilizing said bed, a stationary upstanding centre pin associated with the bed, a worm gear centred on said pin, a worm meshed with the worm gear and slidably keyed on a horizontal shaft having bearings and lugs solidly associated with said bed, a horizontally extending power arm solidly associated with said worm gear and adapted to regularly rotate therewith about the axis of said pin, a similar following arm extending substantially opposite the first arm and free on said pin, a horizontal fixed slideway above said pin, a slide reciprocable for variable point setting in said slideway and having a vertically extending pivot, a second slide revolvable on said pivot, a second slideway reciprocally movable along said slide, a sleeve solidly mounted on the second slideway, a work table solidly mounted on said sleeve for controlled rotary and reciprocal movement together with the second slideway, opposed reciprocal members opposingly movable within the sleeve, means for imparting oppositely directed movement to one reciprocal member by the other, one said reciprocal member being pinned to the power arm and the other member to the following arm, said arms alternately falling in co-aligned position and in unaligned position twice during each table revolution, said table reciprocating as one with the secondary slideway twice during its revolution on a range equal to the distance between a line drawn between the axes of the arm pinnings when the arms lie at their maximum deviation from co-alignment and a line drawn parallel to the first line through the axis of the vertical centre pin, whereby an oval is described by the stationary tool on work properly supported by the table during a cyclic operation consisting of a single revolution produced simultaneously with two complete back-and-then-forth movements of the table.

JOSEPH TORMA.